April 30, 1935.  W. C. PEYTON ET AL  1,999,979
STOKER CONVEYER
Filed Aug. 31, 1931  2 Sheets-Sheet 2

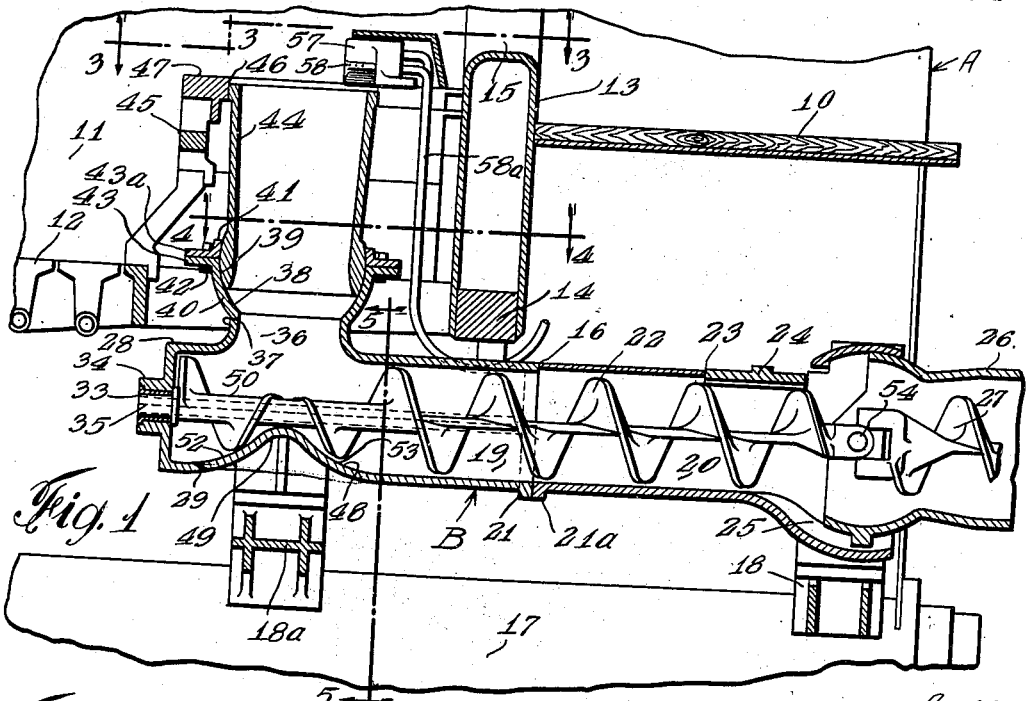
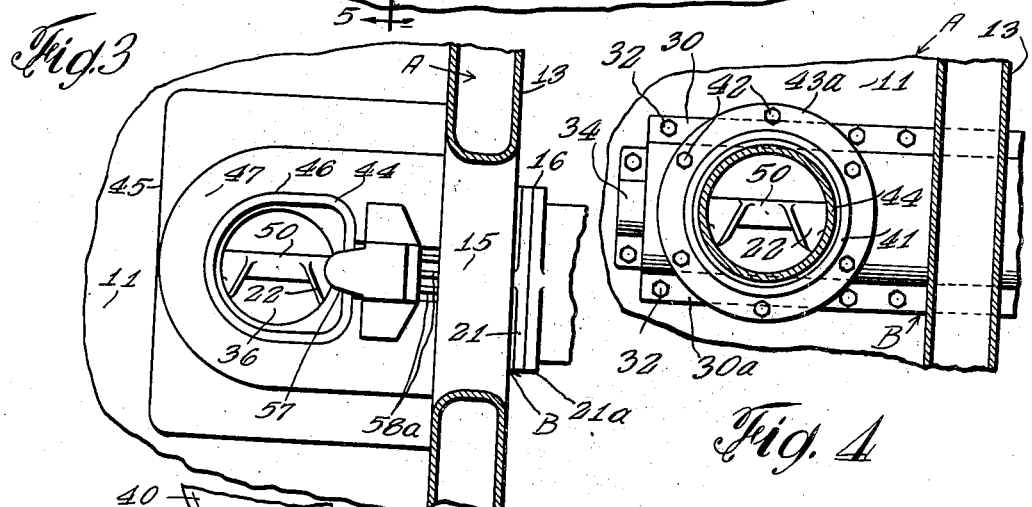
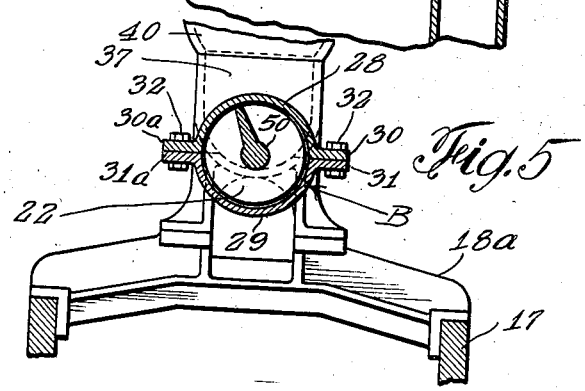

INVENTORS
William C. Peyton
Howard P. Anderson
BY
E. Archer Turner
ATTORNEY.

Patented Apr. 30, 1935

1,999,979

UNITED STATES PATENT OFFICE 1,999,979

STOKER CONVEYER

William C. Peyton, New York, N. Y., and Howard P. Anderson, Erie, Pa., assignors to The Standard Stoker Company, Incorporated, a corporation of Delaware Application August 31, 1931, Serial No. 560,378

16 Claims. (Cl. 198—15)

This invention relates to a conveying system and particularly applicable to locomotive stoker conveying systems in which a horizontal conveyer carries fuel from a tender bin or other source of supply forwardly beneath the mud ring of the locomotive boiler and a riser conduit carries it up through the grates to a sufficient height above the level of the fire to permit distribution thereover in aerial paths.

In such conveying systems there is necessarily an abrupt change in direction from the horizontal conveyer to the riser conduit. The problem of effecting this change in direction of the path of the fuel is one of the objects of this invention. One mode of accomplishing this is illustrated in the patent to Williams 1,142,293, granted June 8, 1915, in which a screw is placed in the vertical riser conduit, this however, necessitates added mechanism and crushing and abrasion of fuel occurs between the adjacent ends of the riser screw and the conveyer screw. A very efficient conveying system is illustrated in the patent to Roesch et al. No. 1,567,083 granted December 29, 1925, in which a gently curving elbow effects the change in the delivery of fuel from the horizontal conveyer to the riser conduit eliminating the screw in the riser conduit. The present device permits a more abrupt change in the path of the fuel, permitting fuel to be delivered through a riser which may be at an angle of 90 degrees with the horizontal conveyer or at an angle even less than 90 degrees without the use of a screw in the riser. In such a construction the riser conduit may be maintained closely adjacent the firebox backwall. This is an obvious desirability in such boiler constructions in which the backwall is vertical or slopes inwardly from top to bottom since less of the firebox area is occupied by the conveying mechanism and the conveying mechanism is farther removed from the hottest part of the fire.

It is therefore, a further object of the invention to provide a conveying mechanism of the type described which is adaptable to boiler construction regardless of the angle of the backhead.

Other and further objects and advantages of the invention will become apparent from the following description taken in connection with the drawings, in which Figure 1 is a central, vertical longitudinal section through the rearward portion of a locomotive and the locomotive unit of the stoker mechanism;

Figure 3 is a plan view of the stoker mechanism on the line 3—3—3 of Figure 1 with the backhead in section;

Figure 4 is a section on the line 4—4 of Figure 1;

Figure 5 is a section on the line 5—5 of Figure 1; and

Figure 2:
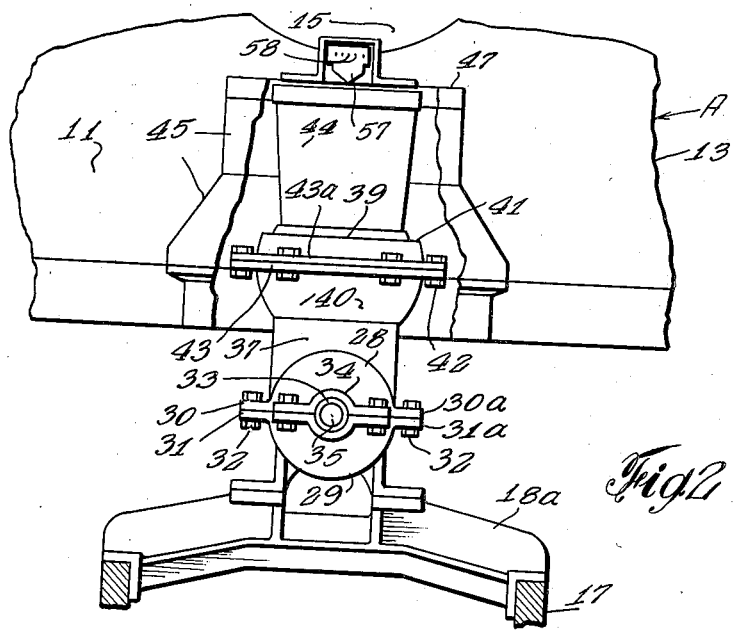
Figure 2 is a front view of the stoker mechanism taken from within the firebox.

In the drawings, referring particularly to Figures 1 to 5, the locomotive is designated generally by the letter A and is provided with a deck 10 and the firebox 11. The firebox grates are shown at 12, the firebox backwall at 13, having a firing opening 15 therethrough and a foundation or mud ring is shown at 14 bounding the bottom of the firebox 11. The stoking mechanism is designated generally by the letter B and comprises a horizontal conveyer conduit 16 supported from the locomotive frame 17 at its rearward end by the transverse foot member 18, and at its forward end by the transverse foot member 18a. The conveyer conduit 16 is preferably formed in two sections, a forward conduit section 19 and a rearward conduit section 20, the adjacent ends of said sections being provided with the flanges 21 and 21a through which they are jointed in any desired manner. The conveyer conduit 16 passes beneath the mud ring 14 and has mounted therein a screw conveyer 22 for advancing fuel therethrough.

The rearward section 20 of the conveyer conduit 16 is provided in its top portion with an inspection opening 23 arranged to receive a cover plate 24, and at its rearward end is formed with a spherical flange 25 arranged to receive the forward end of a transfer conveyer conduit unit 26. Mounted in the transfer conduit 26 is a rotatable screw conveyer 27. The forward section 19 of the conduit 16 is of a peculiar and novel construction, being split horizontally on its longitudinal center line into an upper portion 28 and a lower portion 29. The adjacent edges of the upper portion 28 and the lower portion 29 are provided respectively with the outwardly extending flanges 30, 30a and 31, 31a and are securely attached together as by bolts 32. The forward wall of the conveyer 16 is apertured at 33 and is provided with a bearing member 34 in which is journaled the extended shaft 35 of the screw 22.

The upper portion 28 of the conduit section 18 has an opening 36 formed in the top thereof intermediate its forward and rearward ends. Circumscribing the opening 36 and bounding its marginal edge is a neck 37 preferably formed integral with the upper portion 28. Surmounting the neck 37 is a spherical horizontally split flange 38 constituting one element of a ball joint 39. The lower portion 40 of the split flange 38 being preferably integral with the neck 37 and the upper portion 41 being attachable to the lower portion 40 by means as bolts 42 joining the outwardly extending flanges 43 and 43a of the lower and upper portions 40 and 41 respectively of the split flange 39.

An upwardly extending conduit 44 opens at its upper end above the level of the grates 12 and at its lower end is arranged to form an element of the ball joint 39. The upwardly extending conduit 44 is held in position by the protecting grate or wall 45, which is provided with an opening 46 in its top face 47 to loosely receive and support the upper end of the upwardly extending conduit 44. The floor 48 of the lower portion 29 of the conduit section 18 is provided with a transverse ridge 49 diametrically opposite the opening 36. The crest of the ridge 49 lies just below the shaft 50 of the screw 22, and the sides 52 and 53 of the ridge 49 slope gently downward from both sides of the crest to the level of the floor 48.

The screw 22 is of a peculiar construction and will now be particularly described. The rearward portion of the shaft 50 has a smaller diameter than the forward portion thereof. The screw flights on the reduced portion of the shaft are concave and the screw flights on the remainder of the shaft are straight. The flight of that portion of the screw 22 rearward of the ridge 49 is arranged to advance fuel through the conduit and the flight of that portion of the screw 22 forward of the ridge 49 is reversed with respect to the rearward screw portion. The flights of the screw 22 adjacent the ridge 49 are tapered to conform with the sloping sides of the ridge. The screw 22 is universally connected at its rearward end, as at 54 with the screw section 27 mounted in the conduit 26 which leads from a suitable source of fuel supply, not shown.

At the rear of the discharge opening of the upwardly extending conduit 44 is mounted a steam jet distributor 57. The distributor 57 is provided with a number of jet openings 58 through which steam is emitted against the rising column of fuel being discharged from the conduit 44 and so arranged to distribute fuel evenly over the firebed. A series of pipes 58a are provided for supplying steam to the distributor 57.

In operation, fuel from a suitable source of supply is advanced through the transfer conduit 26 and conduit 16 by means of the screws 27 and 22. When the forward portion of the conduit 16 becomes filled with fuel that portion of the screw 27 rearward of the ridge 49 and adjacent the sloping wall 52, cooperates with the wall 52 to force the fuel in a forward and upward direction and that portion of the screw 27 forward of the ridge 49 and adjacent the oppositely sloping wall 53 cooperates with the wall 53 to force the fuel in a rearward and upward direction. The component of the forces is, therefore, in an upward direction and fuel is forced through the upwardly extending conduit 44 and scattered over the firebed as it emerges from the conduit 44 by the steam blast issuing from the distributor 57.

Figure 6:
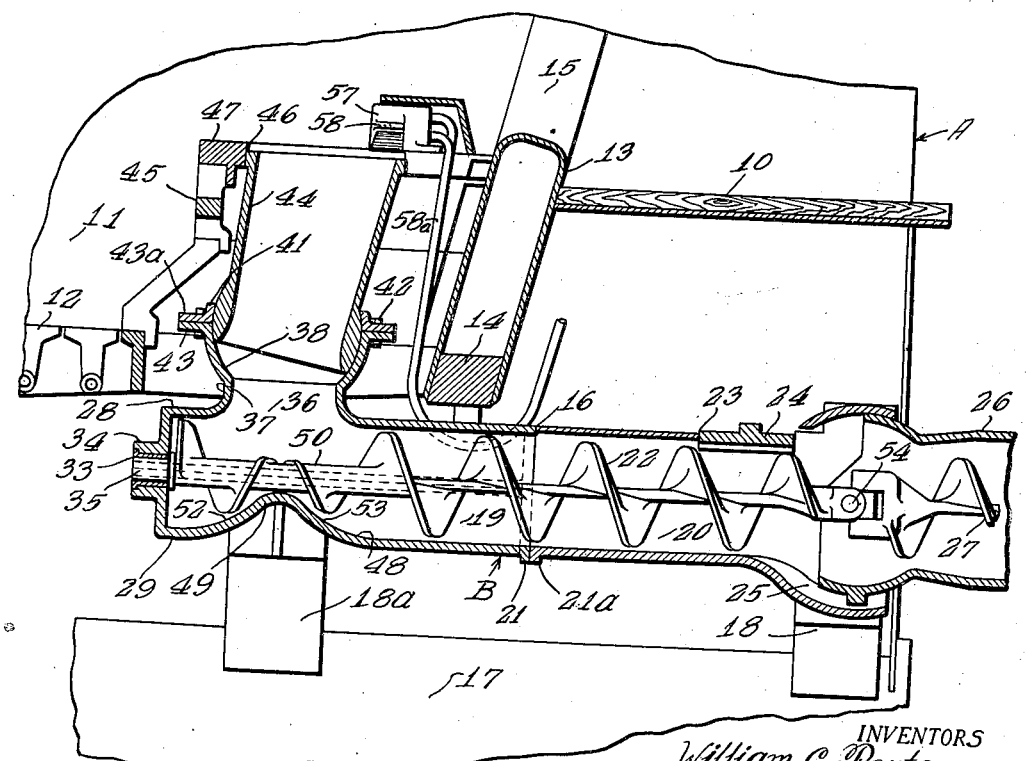
Figure 6 is a view similar to Figure 1 showing a modified form of the invention.

In Figure 6 is shown the same form of fuel conveying mechanism as described in connection with Figures 1 to 5, but applied to a locomotive, the backhead of which slopes inwardly from top to bottom. The ball joint 39 permits movement of the upwardly extending conduit 44 to a position parallel with the backhead, and the novel conveying system makes possible the delivery of fuel through the conduit 44 at an acute angle with the delivery of fuel through the horizontal conduits 26 and 16.

In both forms of the invention, movement of the boiler over the locomotive frame such as movement due to expansion or contraction of the boiler is made possible without injury to the stoker mechanism by reason of the universal mounting of the base of the conduit 44 and its loose engagement at its upper end with the protecting and supporting wall 45. This feature of the invention has been made the subject matter of a divisional application, Serial No. 11208, filed March 15, 1935, for Stoker conveyer.

We claim:

1. In a conveying system, a conduit, a discharge opening intermediate its ends, a screw conveyer mounted in said conduit, the flights of said screw between said discharge opening and one end of said conduit being wound in one direction and the flights of said screw between said discharge opening and the other end of said conduit being wound in the opposite direction, and a gently sloping ridge formed in the wall of said conduit diametrically opposite said discharge opening, the flights of said screw adjacent the sloping sides of said ridge being tapered to conform with said sloping sides.

2. In a conveying system, a conduit having an open receiving end and a closure at its other end, a discharge opening intermediate said ends, a screw conveyer mounted in said conduit, a bearing for the extended shaft of said screw conveyer formed in said closure, the flights of said screw between said discharge opening and said receiving opening being wound in one direction and the flights of said screw between said discharge opening and said closure being wound in the opposite direction, and a gently sloping ridge formed in the wall of said conduit diametrically opposite said discharge opening, the flights of said screw adjacent the sloping sides of said ridge being tapered to conform with said sloping sides.

3. In a conveying system, a conduit having an open receiving end and a closure at its other end, a discharge opening intermediate said ends, a screw conveyer mounted in said conduit, the flights of said screw between said discharge opening and said receiving opening being wound in one direction and the flights of said screw between said discharge opening and said closure being wound in the opposite direction, a portion of said screw between said receiving opening and said discharge opening having a hub of smaller diameter than the remainder of the screw, the screw flights on said reduced hub portion being concave and the screw flights on the remainder of the screw hub being flat, and a gently sloping ridge formed in the wall of said conduit diametrically opposite said discharge opening, the flights of said screw adjacent the sloping sides of said ridge being tapered to conform with said sloping sides.

4. In a conveying system, a conduit, a discharge opening intermediate its ends, a screw conveyer mounted in said conduit, the flights of said screw between said discharge opening and one end of said conduit being wound in one direction and the flights of said screw between said discharge opening and the other end of said conduit being wound in the opposite direction, a gently sloping ridge formed in the wall of said conduit diametrically opposite said discharge opening, the flights of said screw adjacent the sloping sides of said ridge being tapered to conform with said sloping sides, and a discharge conduit communicating with said first named conduit through said discharge opening.

5. In a conveying system, a conduit, a top discharge opening intermediate its ends, a screw conveyer mounted in said conduit, the flights of said screw between said discharge opening and one end of said conduit being wound in one direction and the flights of said screw between said discharge opening and the other end of said conduit being wound in the opposite direction, a gently sloping ridge formed in the wall of said conduit diametrically opposite said discharge opening, the flights of said screw adjacent the sloping sides of said ridge being tapered to conform with said sloping sides, and an upwardly extending discharge conduit universally connected with said first named conduit and communicating therewith through said discharge opening.

6. In a conveying system, a conduit, a top discharge opening intermediate its ends, a screw conveyer mounted in said conduit, the flights of said screw between said discharge opening and one end of said conduit being wound in one direction and the flights of said screw between said discharge opening and the other end of said conduit being wound in the opposite direction, a gently sloping ridge formed in the wall of said conduit diametrically opposite said discharge opening, the flights of said screw adjacent the sloping sides of said ridge being tapered to conform with said sloping sides, a spherical flange bounding the marginal edges of said discharge opening, and an upwardly extending discharge conduit at one end received in said flange and arranged therewith to form a universal connection.

7. In a conveying system a horizontal conduit, a screw conveyer mounted in said conduit, a portion of the screw flight being wound in one direction and the remainder of the screw flight being wound in the opposite direction, an opening in the top wall of said conduit at the juncture of said screw flights, the bottom wall of said conduit being formed with a gently sloping ridge at the juncture of said screw flights, the screw flights adjacent the sloping sides of said ridge being tapered to conform with said sloping sides, and an upwardly extending conduit communicating with said opening in said horizontal conduit.

8. In a conveying system a horizontal conduit, a screw conveyer mounted in said conduit, a portion of the screw flight being wound in one direction and the remainder of the screw flight being wound in the opposite direction, an opening in the top wall of said conduit at the juncture of said screw flight, the bottom wall of said conduit being formed with a gently sloping ridge diametrically opposite the opening in the top wall of the conduit, a flange circumscribing said opening and formed integral with said horizontal conduit, and an upwardly extending conduit, at its lower end received in said flange and arranged to form therewith a universal connection.

9. In a conveying system a horizontal conduit, a screw conveyer mounted in said conduit, a portion of the screw flight being wound in one direction and the remainder of the screw flight being wound in the opposite direction, an opening in the top wall of said conduit at the juncture of said screw flights, the bottom wall of said conduit being formed with a gently sloping ridge at the juncture of said screw flights, the screw flights adjacent the sloping sides of said ridge being tapered to conform with said sloping sides, a spherical horizontally split flange bounding the marginal edges of said opening and an upwardly extending conduit, at its lower end received in said flange and arranged to form therewith a universal connection.

10. In a firebox, a stoker for delivering fuel thereto comprising a substantially horizontal conduit located below the level of the fire, a screw conveyer in said conduit, a portion of the flight of said screw being arranged to advance fuel and the remainder of the screw flight being reversed with respect to the first named flight, an opening in the top wall of said conduit at the juncture of said screw flights, the bottom wall of said conduit being formed with a gently sloping ridge at the juncture of said screw flights, the screw flights adjacent the sloping sides of said ridge being tapered to conform with said sloping sides and an upwardly extending conduit communicating with said horizontal conduit through the said opening in said horizontal conduit and having its discharge opening above the level of the fire.

11. In a firebox, a stoker for delivering fuel thereto comprising a substantially horizontal conduit located below the level of the fire, a screw conveyer in said conduit, a portion of the flight of said screw being arranged to advance fuel and the remainder of the screw flight being reversed with respect to said first named flight, an opening in the top wall of said conduit at the juncture of said screw flights, a gently sloping ridge formed in the bottom wall of said conduit at the juncture of said screw flights, the screw flights adjacent the sloping sides of said ridge being tapered to conform with said sloping sides, a spherical horizontally split flange bounding the marginal edges of said opening and an upwardly extending conduit, at its lower end received in said flange and arranged to form therewith a universal connection and having its discharge opening above the level of the fire.

12. A stoker conduit, said conduit being split horizontally on its longitudinal center line into an upper and a lower section, said upper section having an opening in its top wall intermediate the ends thereof, and a spherical flange formed with said upper section bounding the marginal edges of said opening, said lower section having a ridge formed in its bottom wall diametrically opposite the opening in said upper section, flanges extending laterally from the adjacent marginal edges of said upper and lower section and means cooperating with said flanges for securely uniting said upper and lower sections.

13. A stoker conduit, said conduit being split horizontally on its longitudinal center line into an upper and a lower section, said upper section having an opening in its top wall intermediate the ends thereof, and a spherical flange formed with said upper section bounding the marginal edges of said opening said lower section having a ridge formed in its bottom wall diametrically opposite the opening in said upper section, said upper and lower sections having complementary walls forming an end wall for said conduit, the adjacent edges of said complementary walls each having formed centrally thereof one portion of a bearing member cooperating with each other to form a bearing in said conduit end wall and flanges extending laterally from the adjacent marginal edges of said upper and lower sections for receiving fastening means.

14. A helical conveyer comprising a shaft and a composite thread wound thereon, comprising a long and a short thread, said threads being wound in opposite directions, a portion of said threads at their adjacent ends being tapered inwardly towards the shaft of said helical conveyer, a part of said long thread farthest removed from its tapered end being concave and the remainder of the thread being straight and that portion of said shaft supporting said concave thread having a smaller diameter than the remainder of said shaft.

15. In a conveying system, a stoker conduit, said conduit being split horizontally on its longitudinal center line into an upper and lower section, said upper section having an opening in its top wall between its ends, said lower section having a ridge formed in its bottom wall diametrically opposite the opening in said upper section, a screw conveyer, the flights of said screw between said opening and one end of said conduit being wound in one direction and the flights of said screw between said opening and the other end of said conduit being wound in the opposite direction and means for securing the upper and lower sections of said conduit together.

16. In a conveying system, a stoker conduit, said conduit being split horizontally on its longitudinal center line into an upper and lower section, said upper section having an opening in its top wall between its ends, said lower section having a ridge formed in its bottom wall diametrically opposite the opening in said upper section, a screw conveyer in said conduit, the flight of said screw between said opening and one end of said conduit being wound in one direction and the flights of said screw between said opening and the other end of said conduit being wound in the opposite direction, the flights of said screw adjacent the sloping sides of said ridge being tapered to conform with said sloping sides, a spherical flange bounding the marginal edges of the opening in the top wall of said conduit and an upwardly extending discharge conduit at one end received in said flange and arranged therewith to form a universal connection.

WILLIAM C. PEYTON.
HOWARD P. ANDERSON.